(12) United States Patent
Li et al.

(10) Patent No.: US 12,014,149 B1
(45) Date of Patent: Jun. 18, 2024

(54) MULTI-TURN HUMAN-MACHINE CONVERSATION METHOD AND APPARATUS BASED ON TIME-SEQUENCE FEATURE SCREENING ENCODING MODULE

(71) Applicant: Qilu University of Technology (Shandong Academy of Sciences), Jinan (CN)

(72) Inventors: Dongfeng Li, Jinan (CN); Peng Ji, Jinan (CN); Wanlong Dong, Jinan (CN)

(73) Assignee: Qilu University of Technology (Shandong Academy of Sciences), Jinan (CN)

( * ) Notice: Subject to any disclaimer, the term of this patent is extended or adjusted under 35 U.S.C. 154(b) by 0 days.

(21) Appl. No.: 18/454,893

(22) Filed: Aug. 24, 2023

(30) Foreign Application Priority Data

Mar. 24, 2023 (CN) .......................... 202310295715.3

(51) Int. Cl.
*G06F 40/30* (2020.01)
*G06F 40/56* (2020.01)
(52) U.S. Cl.
CPC .............. *G06F 40/56* (2020.01); *G06F 40/30* (2020.01)
(58) Field of Classification Search
CPC .... G06F 40/211; G06F 40/253; G06F 40/268; G06F 40/284; G06F 40/30; G10L 15/00; G06N 3/08
See application file for complete search history.

(56) References Cited

U.S. PATENT DOCUMENTS

| | | | | |
|---|---|---|---|---|
| 10,802,937 | B2 * | 10/2020 | Crosby | ................... G06N 20/00 |
| 11,416,688 | B2 * | 8/2022 | Wu | .......................... G10L 15/30 |
| 11,431,660 | B1 * | 8/2022 | Leeds | ..................... G10L 15/22 |
| 11,803,703 | B2 * | 10/2023 | Gamon | ................. G06F 40/197 |

(Continued)

FOREIGN PATENT DOCUMENTS

| CN | 111125326 A | 5/2020 |
|---|---|---|
| CN | 113537024 A | 10/2021 |

(Continued)

*Primary Examiner* — Lamont M Spooner

(57) ABSTRACT

Disclosed is a multi-turn human-machine conversation method and apparatus based on a time-sequence feature screening encoding module, belonging to the technical field of natural language processing and artificial intelligence. The technical problem to be solved by the disclosure is how to screen information for each utterance in a historical conversation so as to obtain semantic information only relevant to candidate responses and how to reserve and extract time-sequence features in the historical conversation, thus improving prediction accuracy of a multi-turn human-machine conversation system. The adopted technical scheme is as follows: S1, acquiring a multi-turn human-machine conversation data set; S2, constructing a multi-turn human-machine conversation model: constructing a multi-turn human-machine conversation model based on the time-sequence feature screening encoding module; and S3, training the multi-turn human-machine conversation model: training the multi-turn human-machine conversation model constructed in S2 on the multi-turn human-machine conversation data set obtained in S1.

2 Claims, 4 Drawing Sheets

(56) References Cited

U.S. PATENT DOCUMENTS

| | | | |
|---|---|---|---|
| 2016/0219048 A1* | 7/2016 | Porras | H04L 41/40 |
| 2018/0330723 A1* | 11/2018 | Acero | G10L 15/30 |
| 2019/0020606 A1* | 1/2019 | Vasudeva | H04L 51/56 |
| 2019/0138268 A1 | 5/2019 | Andersen et al. | |
| 2019/0163965 A1* | 5/2019 | Yoo | G06V 40/176 |
| 2019/0341036 A1* | 11/2019 | Zhang | G06F 40/35 |
| 2021/0099317 A1* | 4/2021 | Hilleli | G06F 40/295 |
| 2021/0118442 A1* | 4/2021 | Poddar | G06Q 30/0643 |
| 2021/0150118 A1 | 5/2021 | Le et al. | |
| 2021/0174026 A1* | 6/2021 | Wu | G06N 3/045 |
| 2021/0174798 A1* | 6/2021 | Wu | G06F 18/2148 |
| 2021/0183484 A1* | 6/2021 | Shaib | G06F 40/295 |
| 2021/0256417 A1* | 8/2021 | Kneller | G10L 15/1815 |
| 2021/0294781 A1* | 9/2021 | Fernandez et al. | G06N 20/00 |
| 2021/0294828 A1* | 9/2021 | Tomkins | G06F 16/2237 |
| 2021/0294829 A1* | 9/2021 | Bender | G10L 15/16 |
| 2021/0294970 A1* | 9/2021 | Bender | G06F 16/248 |
| 2021/0295822 A1* | 9/2021 | Tomkins | G06F 40/289 |
| 2021/0327411 A1* | 10/2021 | Wu | G06F 40/284 |
| 2022/0019579 A1* | 1/2022 | Meyerzon | G06N 5/022 |
| 2022/0019740 A1* | 1/2022 | Meyerzon | G06F 16/906 |
| 2022/0019905 A1* | 1/2022 | Meyerzon | G06N 3/045 |
| 2022/0036890 A1* | 2/2022 | Yuan | G10L 15/1815 |
| 2022/0068263 A1* | 3/2022 | Roy | G06F 40/30 |
| 2022/0139384 A1* | 5/2022 | Wu | G06F 40/35 704/257 |
| 2022/0164548 A1* | 5/2022 | Tumuluri | G06N 3/084 |
| 2022/0277031 A1* | 9/2022 | Quamar | G06F 16/90332 |
| 2022/0358297 A1 | 11/2022 | Ma | |
| 2022/0405489 A1* | 12/2022 | Radkoff | G06V 10/7788 |
| 2023/0014775 A1* | 1/2023 | Dotan-Cohen | G06Q 10/1097 |
| 2023/0085781 A1* | 3/2023 | Zhuge | G08G 5/0013 701/3 |
| 2023/0237276 A1* | 7/2023 | Lima | G06F 16/35 704/9 |
| 2023/0244855 A1* | 8/2023 | Attwater | G06F 40/20 715/254 |
| 2023/0244968 A1* | 8/2023 | Gurin | G06N 3/0475 706/11 |
| 2023/0306205 A1* | 9/2023 | Maeder | G06F 16/3344 |
| 2023/0315999 A1* | 10/2023 | Mohammed | G06F 16/345 704/9 |
| 2024/0078264 A1* | 3/2024 | Solis | G06F 16/90332 |

FOREIGN PATENT DOCUMENTS

| | | |
|---|---|---|
| CN | 114281954 A | 4/2022 |
| CN | 114722838 A | 7/2022 |
| CN | 115129831 A | 9/2022 |
| CN | 115544231 A | 12/2022 |

\* cited by examiner

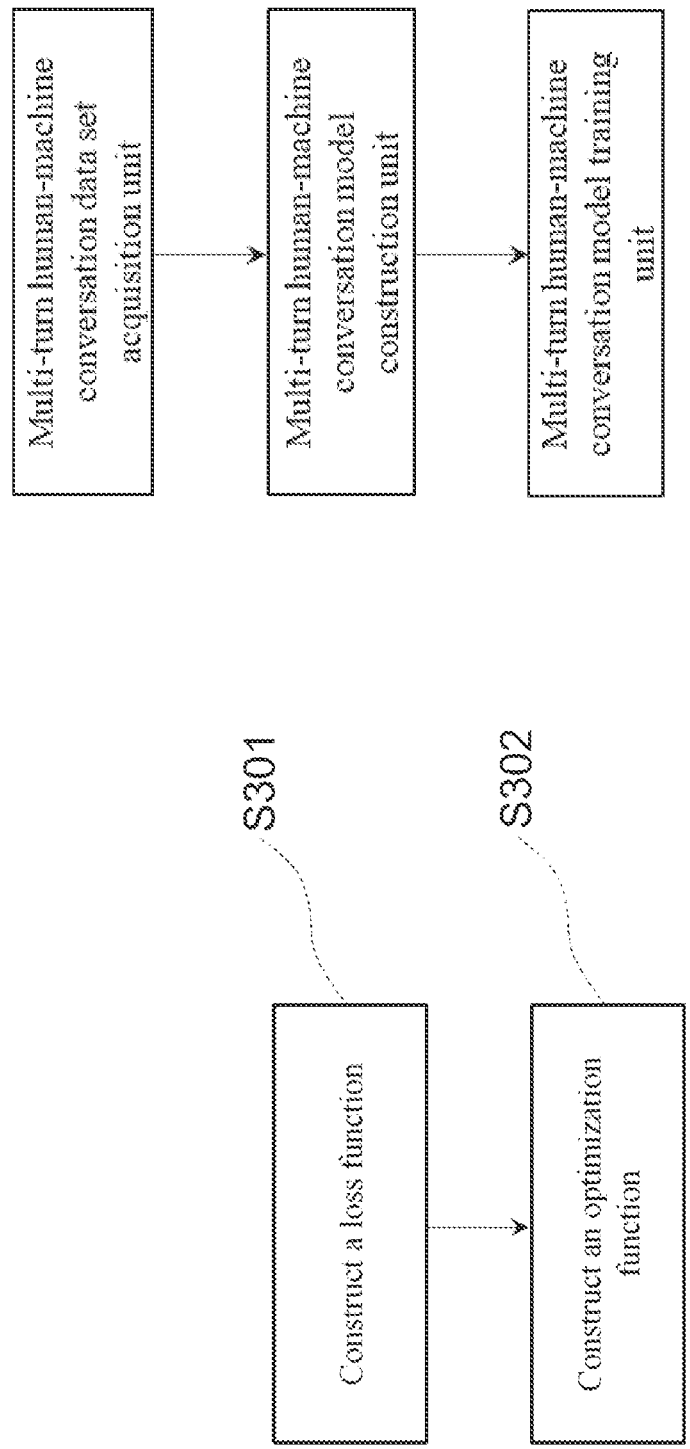

MULTI-TURN HUMAN-MACHINE CONVERSATION METHOD AND APPARATUS BASED ON TIME-SEQUENCE FEATURE SCREENING ENCODING MODULE

CROSS REFERENCE TO RELATED APPLICATION

This application claims foreign priority of Chinese Patent Application No. 202310295715.3, filed on Mar. 24, 2023, in the China National Intellectual Property Administration, the disclosures of all of which are hereby incorporated by reference.

TECHNICAL FIELD

The disclosure relates to the technical field of artificial intelligence and natural language processing, and in particular to a multi-turn human-machine conversation method and apparatus based on a time-sequence feature screening encoding module.

BACKGROUND

With the continuous development of artificial intelligence technology, the way of human-machine interaction is gradually changed from a graphical user interface to a conversation user interface. The conversation with a machine is also a constantly pursued target in the field of artificial intelligence. At present, human-machine conversation technology may be divided into single-turn human-machine conversation and multi-turn human-machine conversation, depending on different conversation rounds. The multi-turn human-machine conversation has more practical applications, such as intelligent customer service, a mobile assistant and a search engine, because it is closer to a conversation scene of human beings. As an important way of human-machine interaction, the multi-turn human-machine conversation technology has great research significance and application value, but is also more challenging.

Specifically, at present, the challenges faced by the multi-turn human-machine conversation technology mainly include the following two points: first, the information contained in each utterance in a historical conversation sequence is not all useful for final response selection; the most important difference between the multi-turn human-machine conversation and the single-turn human-machine conversation is that the subject of the single-turn conversation is unique, while the subject of the multi-turn human-machine conversation may not be only one, so that how to identify and screen semantic information for each utterance in historical conversation is the primary challenge faced by the multi-turn human-machine conversation technology. Second, for a multi-turn human-machine conversation system, the sequence among utterances is important feature information that cannot be ignored; and in the course of conversation, two or more identical sentences may have different semantics and intentions due to different sequences. Therefore, if the time-sequence feature in the historical conversation can be effectively extracted, the performance of the multi-turn human-machine conversation method can be improved. So far, however, existing methods have not substantially solved these problems. Therefore, the multi-turn human-machine conversation is still a very challenging task.

Aiming at the challenges faced by the multi-turn human-machine conversation, the disclosure provides a multi-turn human-machine conversation method and apparatus based on a time-sequence feature screening encoding module, which can screen information for each utterance in historical conversation so as to obtain semantic information only relevant to candidate responses and reserve and extract time-sequence features in the historical conversation, thus improving prediction accuracy of a multi-turn human-machine conversation system.

SUMMARY

The technical problem to be solved by the disclosure is to provide a multi-turn human-machine conversation method and apparatus based on a time-sequence feature screening encoding module, which can screen information for each utterance in a historical conversation so as to obtain semantic information only relevant to candidate responses and reserve and extract time-sequence features in the historical conversation, thus improving prediction accuracy of a multi-turn human-machine conversation system.

The purpose of the disclosure is achieved by the following technical means.

A multi-turn human-machine conversation method based on a time-sequence feature screening encoding module includes following steps:
S1, acquiring a multi-turn human-machine conversation data set: downloading a disclosed multi-turn human-machine conversation data set from a network or automatically constructing a multi-turn human-machine conversation data set;
S2, constructing a multi-turn human-machine conversation model: constructing a multi-turn human-machine conversation model based on a time-sequence feature screening encoding module;
S3, training the multi-turn human-machine conversation model: training the multi-turn human-machine conversation model constructed in S2 using the multi-turn human-machine conversation data set obtained in S1.

As a further limitation to the present technical scheme, the constructing a multi-turn human-machine conversation model in S2 includes constructing an input module, constructing a pre-training model embedding module, constructing a time-sequence feature screening encoding module, and constructing a label prediction module.

As a further limitation to the present technical scheme, the input module is configured to, for each piece of data in the data set, records all sentences in the historical conversation as $h_1, h_2, \ldots h_n$ respectively according to a sequence of the conversation; selects a response from a plurality of responses as a current response, and formalizes the response as r; determines a label of the data according to whether the response is a positive response, that is, if the response is a positive response, records the label as 1, otherwise, records the label as 0; and $h_1, h_2, \ldots h_n$, r and the label form a piece of input data together.

As a further limitation to the present technical scheme, the pre-training model embedding module is configured to perform embedding processing on the input data constructed by the input module by using a pre-training language module BERT, to obtain embedding representation and candidate response embedding representation of each utterance in the historical conversation, recorded as $\vec{E_1^h}, \vec{E_2^h}, \ldots \vec{E_n^h}$ and $\vec{E^r}$; and for specific implementation, see the following formula:

$\overrightarrow{E_1^h}=\text{BERT}(h_1), \overrightarrow{E_2^h}=\text{BERT}(h_2), \overrightarrow{E_n^h}=\text{BERT}(h_n);$ $\overrightarrow{E^r}=\text{BERT}(r);$ where $h_1, h_2, \ldots h_n$ represent the first utterance, the second utterance, . . . , the $n^{th}$ utterance in the historical conversation, and r represents the candidate response.

As a further limitation to the present technical scheme, the time-sequence feature screening encoding module is configured to receive the embedding representation and candidate response embedding representation of each utterance in the historical conversation output by the pre-training model embedding module, and then perform encoding operation on the embedding representation and candidate response embedding representation respectively by using an encoder, thus completing the semantic information screening and time-sequence feature extraction process through an attention mechanism and fusion operation, so as to obtain semantic feature representation of the conversation.

Specifically, the implementation process of the module is as follows:

first, performing encoding operation on the candidate response embedding representation by using the encoder, to obtain candidate response encoding representation, recorded as $\overrightarrow{F^r}$; and for specific implementation, see the following formula:

$\overrightarrow{F^r}=\text{Encoder}(\overrightarrow{E^r});$ where $\overrightarrow{E^r}$ represents the candidate response embedding representation;

then performing encoding operation on embedding representation of the first utterance in the historical conversation by using the encoder, to obtain encoding representation 1, recorded as $\overrightarrow{F_1^h}$; then completing the information screening process of the candidate response encoding representation to the encoding representation 1 by using the attention mechanism, to obtain encoding alignment representation 1, recorded as $\overrightarrow{Z_1^h}$; and for specific implementation, see the following formula:

$\overrightarrow{F_1^h}=\text{Encoder}(\overrightarrow{E_1^h});$ $\overrightarrow{Z_1^h}=\text{Attention}(\overrightarrow{F^r};\overrightarrow{F_1^h});$ where $\overrightarrow{E_1^h}$ represents embedding representation of the first utterance, namely, embedding representation 1;

$\overrightarrow{F^r}$ represents candidate response encoding representation;

then performing encoding operation on embedding representation of the second utterance in the historical conversation by using the encoder, to obtain encoding representation 2, recorded as $\overrightarrow{F_2^h}$; then completing the information fusion process for the encoding alignment representation 1 and the encoding representation 2 by using addition operation, to obtain encoding fusion representation 2, recorded as $\overrightarrow{T_2^h}$; finally, completing the information screening process of the candidate response encoding representation to the encoding fusion representation 2 by using the attention mechanism, to obtain encoding alignment representation 2, recorded as $\overrightarrow{Z_2^h}$; and for specific implementation, see the following formula:

$\overrightarrow{F_2^h}=\text{Encoder}(\overrightarrow{E_2^h});$ $\overrightarrow{T_2^h}=\overrightarrow{Z_1^h}+\overrightarrow{F_2^h};$ $\overrightarrow{Z_2^h}=\text{Attention}(\overrightarrow{F^r};\overrightarrow{T_2^h});$ where $\overrightarrow{E_2^h}$ represents embedding representation of the second utterance, namely, embedding representation 2;

$\overrightarrow{Z_1^h}$ represents encoding alignment representation 1; and $\overrightarrow{F^r}$ represents candidate response encoding representation;

then performing encoding operation on embedding representation of the third utterance in the historical conversation by using the encoder with an operation process being the same as the operation process of the encoding operation performed on the embedding representation of the second utterance in the historical conversation by using the encoder, to obtain encoding alignment representation 3, recorded as $\overrightarrow{Z_3^h}$, and so on, until the same operation is performed on the $n^{th}$ utterance in the historical conversation, finally, obtaining the encoding alignment representation n, recorded as $\overrightarrow{Z_n^h}$; for the $n^{th}$ utterance in the historical conversation, performing encoding operation on an embedding representation of the $n^{th}$ utterance in the historical conversation by using the encoder, to obtain encoding representation n, recorded as $\overrightarrow{F_n^h}$; then completing the information fusion process for the encoding alignment representation n-1 and the encoding representation n by using addition operation, to obtain encoding fusion representation n, recorded as $\overrightarrow{T_n^h}$; finally, completing the information screening process of the candidate response encoding representation to the encoding fusion representation n by using the attention mechanism, to obtain encoding alignment representation n, recorded as $\overrightarrow{Z_n^h}$; and for specific implementation, see the following formula:

$\overrightarrow{F_n^h}=\text{Encoder}(\overrightarrow{E_n^h});$ $\overrightarrow{T_n^h}=\overrightarrow{Z_{n-1}^h}+\overrightarrow{F_n^h};$ $\overrightarrow{Z_n^h}=\text{Attention}(\overrightarrow{F^r};\overrightarrow{T_n^h});$ where $\overrightarrow{E_n^h}$ represents embedding representation of the $n^{th}$ utterance, namely, embedding representation n; $\overrightarrow{Z_{n-1}^h}$ represents encoding alignment representation n-1; and $\overrightarrow{F^r}$ represents candidate response encoding representation;

finally, completing the information fusion process for the encoding alignment representation n and the candidate response encoding representation by using addition operation, to obtain semantic feature representation of the conversation, recorded as $\overrightarrow{Q}$; and for specific implementation, see the following formula:

$\overrightarrow{Q}=\overrightarrow{Z_n^h}+\overrightarrow{F^r};$ where $\overrightarrow{Z_n^h}$ represents the encoding alignment representation n; and $\overrightarrow{F^r}$ represents the candidate response encoding representation.

A multi-turn human-machine conversation apparatus applied in the above method, including:
 a multi-turn human-machine conversation data set acquisition unit, configured to download a disclosed multi-turn human-machine conversation data set from a network or automatically construct a multi-turn human-machine conversation data set;
 a multi-turn human-machine conversation model construction unit, configured to construct a pre-training model embedding module, construct a time-sequence feature screening encoding module, and construct a label prediction module, so as to construct a multi-turn human-machine conversation model; and
 a multi-turn human-machine conversation model training unit, configured to construct a loss function and an optimization function, thus completing prediction of a candidate response.

Compared with the existing technology, the disclosure has the following beneficial effects:

(1) By utilizing the pre-training model embedding module, deep semantic embedding features in the historical conversation and the candidate response may be captured, thus obtaining richer and more accurate embedding representation.

(2) By utilizing the time-sequence feature screening encoding module, information screening may be performed on each utterance in the historical conversation so as to obtain semantic information only relevant to candidate response, thus obtaining more complete and accurate semantic feature representation.

(3) By utilizing the time-sequence feature screening encoding module, time-sequence feature in the historical conversation may be reserved and extracted, thus improving prediction accuracy of the multi-turn human-machine conversation system.

(4) According to the method and apparatus provided by the disclosure, in conjunction with the time-sequence feature screening encoding module, the prediction accuracy of the multi-round man-machine conversation model may be effectively improved.

BRIEF DESCRIPTION OF DRAWINGS

FIG. 3 is a flowchart for training a multi-turn human-machine conversation model;

FIG. 4 is a flowchart of a multi-turn human-machine conversation apparatus based on a time-sequence feature screening encoding module;

DETAILED DESCRIPTION OF THE EMBODIMENTS

The technical schemes in the embodiments of the disclosure are clearly and completely described below in conjunction with the accompanying drawings in the embodiments of the disclosure. Apparently, the embodiments described are only a part rather than all of the embodiments of the disclosure. All other embodiments obtained by those of ordinary skilled in the art based on the embodiments of the disclosure without creative efforts shall fall within the protection scope of the disclosure.

Figures 1, 2:
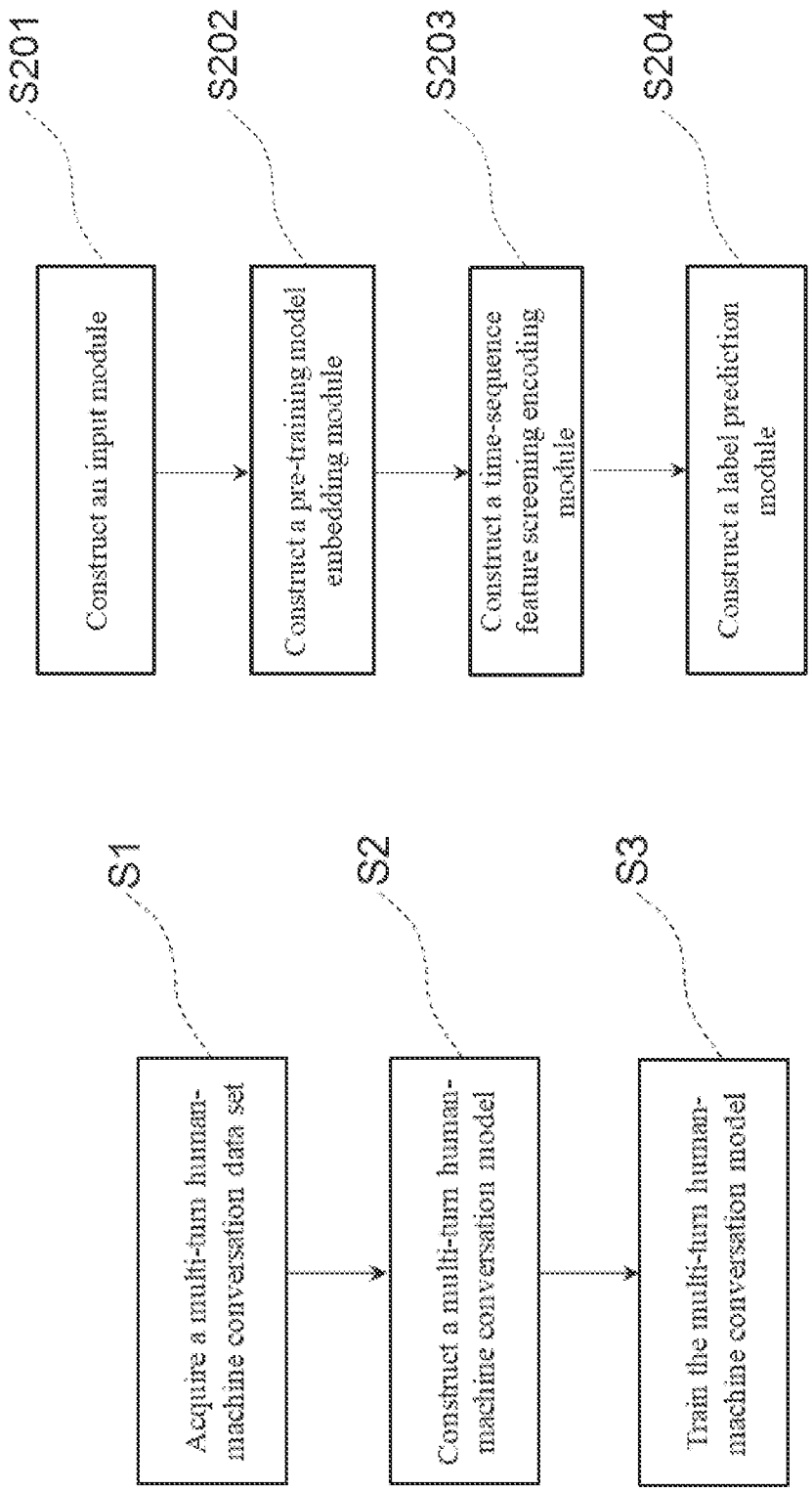
FIG. 1 is a flowchart of a multi-turn human-machine conversation method based on a time-sequence feature screening encoding module.
FIG. 2 is a flowchart for constructing a multi-turn human-machine conversation model.

As shown in FIG. 1, a multi-turn human-machine conversation method based on a time-sequence feature screening encoding module includes following steps:

At S1, a multi-turn human-machine conversation data set is acquired: a disclosed multi-turn human-machine conversation data set is downloaded from a network or a multi-turn human-machine conversation data set is automatically constructed;

At S2, a multi-turn human-machine conversation model is constructed: a multi-turn human-machine conversation model is constructed by using a time-sequence feature screening encoding module.

At S3, the multi-turn human-machine conversation model is trained: the multi-turn human-machine conversation model constructed in S2 is trained using the multi-turn human-machine conversation data set obtained in S1.

At S1, a multi-turn human-machine conversation data set is acquired:
 a disclosed multi-turn human-machine conversation data set is downloaded from a network.

For example: there are a number of disclosed multi-turn human-machine conversation data sets on the network, such as Ubuntu Dialogue Corpus. The data format in the data set is as follows:

| | | |
|---|---|---|
| Historical conversation | $S_1$ | i need to remove all lines matching __number__ __number__ from access log can anyone tell me the piped command im noob |
| | $S_2$ | sed removes entire lines x1q?? |
| | $S_3$ | sed -i __path__ __number__ __number__ __path__ myfile |
| | $S_4$ | that alters myfile |
| | $S_5$ | it can ys |
| | $S_6$ | with that pattern |
| Candidate responses | Positive (label: 1) | oh wait uh matches any char sorry sed __path__ 0\ 0\ 1/d deletes all lines with __number__ __number__ in them |
| | Negative (label: 0) | it s stable version if you don' t mind paste whole output on paste ubuntu com |

In a training set and a validation set, there is only one positive response (Positive(label: 1)) and one negative response (negative(label:0)) for a same historical conversation sequence; in a test set, there is only one positive response (Positive (label: 1)) and nine negative responses (negative(label:0)).

At S2, a multi-turn human-machine conversation model is constructed.

The process of constructing the multi-turn human-machine conversation model is shown in FIG. 2, the main operation including constructing an input module, constructing a pre-training model embedding module, constructing a time-sequence feature screening encoding module, and constructing a label prediction module.

At S201, an input module is constructed.

For each piece of data in the data set, all sentences in the historical conversation are recorded as $h_1, h_2, \ldots h_n$ respectively according to a sequence of the conversation; a response is selected from a plurality of responses as a current response, and formalized as r; according to whether the response is a positive response, a label of the data is determined, that is, if the response is a positive response, the label is recorded as 1; otherwise, the label e is recorded as 0; and a piece of input data is formed by $h_1, h_2, \ldots h_n$, r and the label together.

For example, data shown in S1 is taken as an example to form a piece of input data. The result is as follows:

($h_1$: i need to remove all lines matching _number_ _number_ from access log can anyone tell me the piped command im noob, $h_2$: sed removes entire lines x1q??, $h_3$: sed–i _path_ _number_ _number_ _path_ myfile, $h_4$: that alters myfile, $h_5$: it can ys, $h_6$: with that pattern, r: oh wait uh matches any char sorry sed _path_0\0\1/d deletes all lines with _number_ _number_ in them, 1).

At S202, a pre-training model embedding module is constructed.

The pre-training model embedding module is configured to perform embedding processing on the input data constructed in S201 by using a pre-training language module BERT, to obtain embedding representation and candidate response embedding representation of each utterance in the historical conversation, recorded as $\vec{E_1^h}, \vec{E_2^h}, \ldots \vec{E_n^h}$ and $\vec{E^r}$; and for specific implementation, see the following formula:

$\vec{E_1^h}$=BERT($h_1$), $\vec{E_2^h}$=BERT($h_2$), $\ldots \vec{E_n^h}$=BERT($h_n$)
$\vec{E^r}$=BERT($r$);

where $h_1, h_2, \ldots, h_n$ represent the first utterance, the second utterance, ... the $n^{th}$ utterance in the historical conversation, and r represents the candidate response.

For example, when the disclosure is implemented on the Ubuntu Dialogue Corpus data set, the operation of the module is completed by using the pre-training language model BERT, and all settings are according to the default settings of BERT in pytorch. In pytorch, the code described above is implemented as follows:

Input data is encoded by using an embedding layer of BERT.
h_encoder_list=[ ]
for i in h_embed_list:
h_encoder_list.append(BERT(i) [1])
r_embed=BERT(r) [1] where
h_embed_list represents each utterance in the historical conversation, r is candidate response, h_encoder_list represents embedding representation of each utterance in the historical conversation, and r_embed represents embedding feature representation of a question.

At S203, a time-sequence feature screening encoding module is constructed.

Figure 5:
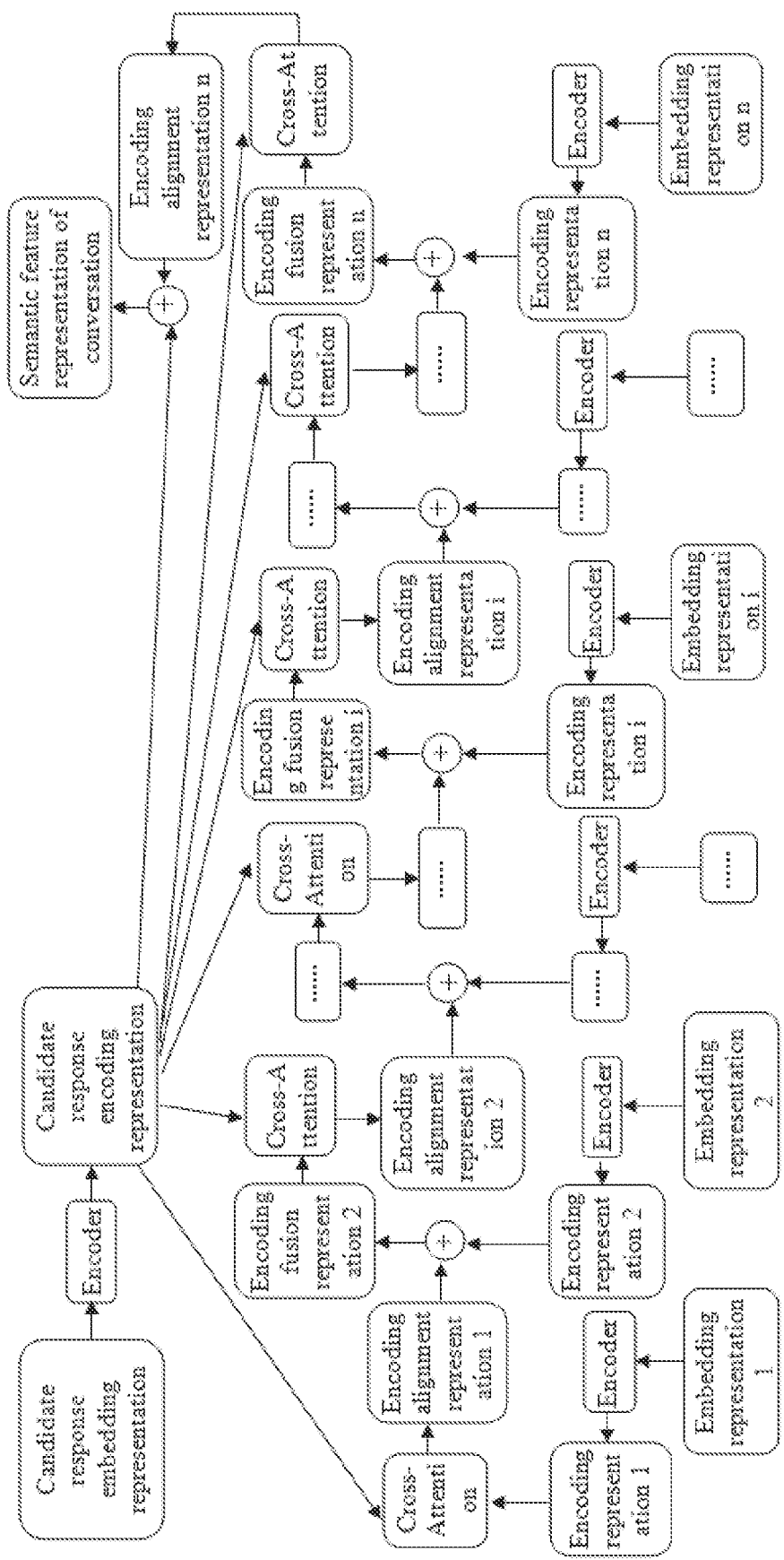
FIG. 5 is a structural schematic diagram of a time-sequence feature screening encoding module.

The time-sequence feature screening encoding module is shown in FIG. 5. The time-sequence feature screening encoding module is configured to receive the embedding representation and candidate response embedding representation of each utterance in the historical conversation output by the pre-training model embedding module, then perform encoding operation on the embedding representation and candidate response embedding representation by using an encoder, thus completing the semantic information screening and time-sequence feature extraction process through an attention mechanism and fusion operation, so as to obtain semantic feature representation of the conversation, recorded as $\vec{Q}$, and transmits the semantic feature representation to a label prediction module.

At S204, a label prediction module is constructed.

The semantic feature representation of the conversation obtained in S203 will be taken as input of the module, which is processed by a dense network with a dimension of 1 and an activation function of Sigmod to obtain the probability that the current response is a positive response.

When the model is not yet trained, S3 needs to be further performed for training to optimize parameters of the model; after the model is trained, S204 maybe performed to predict which of the candidate responses is the positive response.

At S3, a multi-turn human-machine conversation model is trained.

The multi-turn human-machine conversation model constructed in S2 is trained on the multi-turn human-machine conversation data set obtained in S1. The process is shown in FIG. 3.

At S301, a loss function is constructed.

In the disclosure, cross entropy is taken as the loss function, the formula is as follows:

$$L_{loss} = -\sum_{i=1}^{n}(y_{true})\log(y_{pred}),$$

where $y_{true}$ is a real label, and $y_{pred}$ is the correct probability of model output.

For example, in pytorch, the code described above is implemented as follows:

The error between a predicted value and the label is calculated by using across entropy loss function.
loss_fct=CrossEntropyLoss ( )
loss=loss_fct(logits. view(−1, self.num_labels), labels.view(−1))

where labels are real labels, and logits is the correct probability of model output.

At S302, an optimization function is constructed.

The model tests various optimization functions, and finally, selects an AdamW optimization function as the optimization function, except its learning rate set to 2e-5, other hyperparameters of AdamW are set to the default values in pytorch.

For example, in pytorch, the code described above is implemented as follows:

Model parameters are optimized by an AdamW optimizer.
optimizer=AdamW (optimizer_grouped_parameters, 1r=2e−5) where optimizer_grouped_parameters are parameters to be optimized, default to all parameters in an auto question-answering model.

When the model is not yet trained, S3 needs to be further performed for training to optimize parameters of the model; after the model is trained, S204 may be performed to predict which of the candidate responses is the positive response.

An apparatus mainly includes three units, namely, a multi-turn human-machine conversation data set acquisition unit, a multi-turn human-machine conversation model construction unit and a multi-turn human-machine conversation model training unit. The process is shown in FIG. 4, and the specific function of each unit is as follows.

The multi-turn human-machine conversation data set acquisition unit is configured to download a disclosed multi-turn human-machine conversation data set from a network or automatically construct a multi-turn human-machine conversation data set.

The multi-turn human-machine conversation model construction unit is configured to construct a pre-training model embedding module, construct a time-sequence feature screening encoding module, and construct a label prediction module, so as to construct a multi-turn human-machine conversation model.

The multi-turn human-machine conversation model training unit is configured to construct a loss function and an optimization function, thus completing prediction of a candidate response.

Furthermore, the multi-turn human-machine conversation model construction unit further includes:
- a construction input module unit, which is in charge of preprocessing an original data set to construct input data;
- a construction pre-training model embedding module unit, which is in charge of performing embedding processing on the input data respectively by using a pre-training language module BERT, to obtain embedding representation and candidate response embedding representation of each utterance in the historical conversation;
- a construction time-sequence feature screening encoding module unit, which is in charge of receiving the embedding representation and candidate response embedding representation of each utterance in the historical conversation output by the pre-training model embedding module, and then performing encoding operation on the embedding representation and candidate response embedding representation by using an encoder, thus completing the semantic information screening and time-sequence feature extraction process through an attention mechanism and fusion operation, so as to obtain semantic feature representation of the conversation; and
- a construction label predication module unit, which is in charge of judging whether the current response is a positive response or not based on semantic feature representation of the conversation.

The multi-turn human-machine conversation model training unit further includes:
- a construction loss function unit, which is in charge of calculating the error between a predicated result and real data by using the cross entropy loss function; and
- a construction optimization function unit, which is in charge of training and adjusting parameters in model training, so as to reduce a predication error.

The disclosure provides a storage medium storing a plurality of instructions where the instructions are loaded by a processor to execute the steps of the above multi-turn human-machine conversation method.

The disclosure provides an electronic device, the electronic device including:
the above storage medium; and a processor, configured to execute the instructions in the storage medium. A model framework based on a time-sequence feature screening encoding module.

Figure 6:
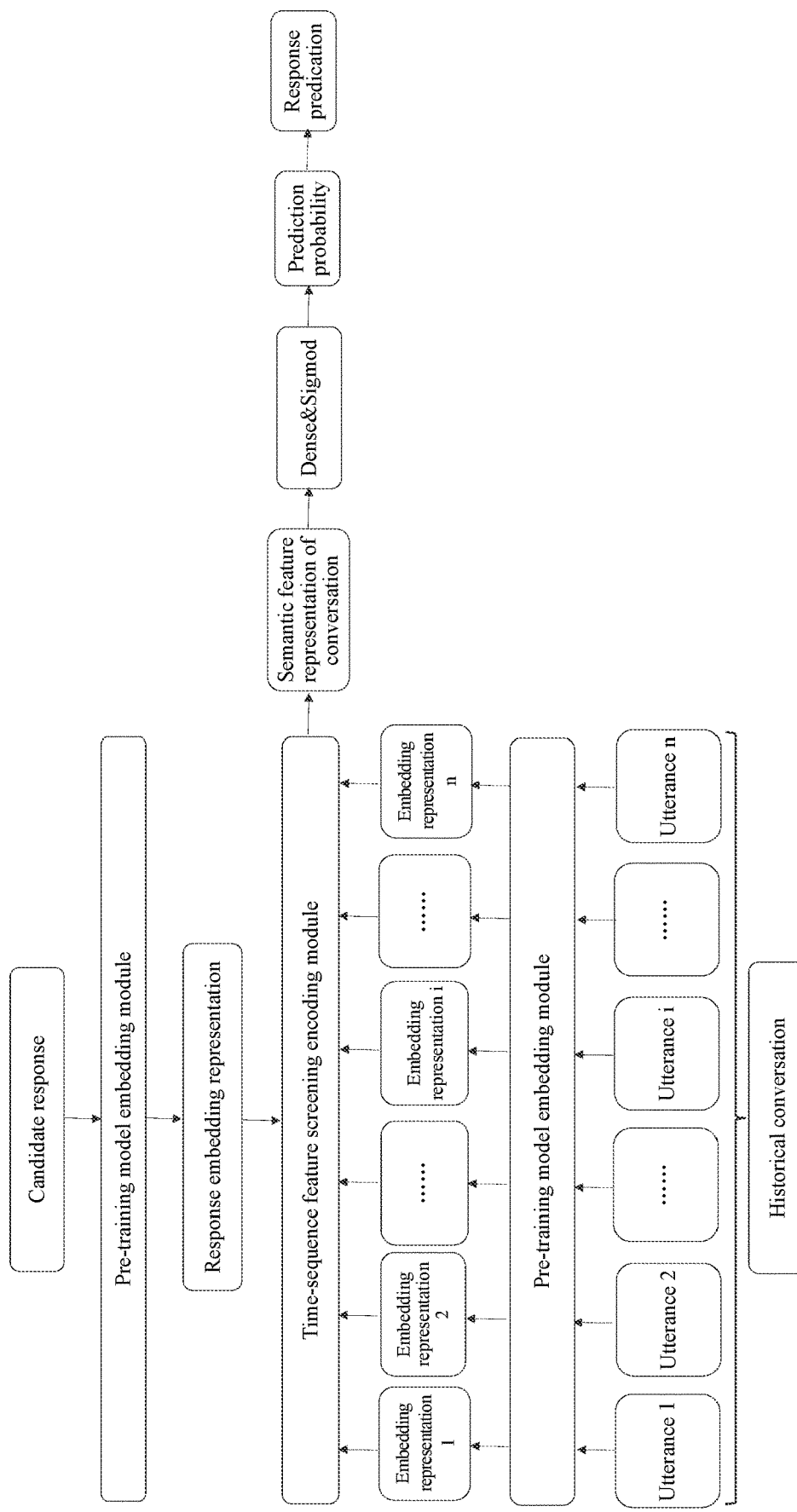
FIG. 6 is a framework diagram of a multi-turn human-machine conversation model based on a time-sequence feature screening encoding module.

The overall model framework structure of the disclosure is shown in FIG. 6. As shown in FIG. 6, the main framework structure of the disclosure includes a pre-training model embedding module, a time-sequence feature screening encoding module, and a label prediction module. The pre-training model embedding module is configured to perform embedding processing on each utterance and candidate response in historical conversation by using a pre-training language module, to obtain embedding representation and candidate response embedding representation of each utterance in the historical conversation, and transmit the embedding representation and candidate response embedding representation to the time-sequence feature screening encoding module. The time-sequence feature screening encoding module performs screening and fusion processing on the utterances in the historical conversation respectively, thus finally obtaining semantic feature representation of the conversation, and transmits the semantic feature representation to the label prediction module. The label prediction module maps the semantic feature representation of the conversation to a floating point value on the specified interval, which serves as the matching degree between the candidate response and the historical conversation; and then the matching degree of each candidate response is compared, and the response with the highest matching degree is taken as the positive response.

The time-sequence feature screening encoding module is shown in FIG. 5. The time-sequence feature screening encoding module is configured to receive the embedding representation and candidate response embedding representation of each utterance in the historical conversation output by the pre-training model embedding module, and then perform encoding operation on the embedding representation and candidate response embedding representation by using an encoder, thus completing the semantic information screening and time-sequence feature extraction process through an attention mechanism and fusion operation, so as to obtain semantic feature representation of the conversation.

Specifically, the implementation process of the module is as follows:

first, performing encoding operation on the candidate response embedding representation by using the encoder, to obtain candidate response encoding representation, recorded as $\vec{F^r}$; and for specific implementation, see the following formula:

$$\vec{F_1^h} = \text{Encoder}(\vec{E^r});$$

where $\vec{E^r}$ represents the candidate response embedding representation.

then performing encoding operation on embedding representation of the first utterance in the historical conversation by using the encoder, to obtain encoding representation 1, recorded as $\vec{F_1^h}$; then completing the information screening process of the candidate response encoding representation to the encoding representation 1 by using the attention mechanism, to obtain encoding alignment representation 1, recorded as $\vec{Z_1^h}$; and for specific implementation, see the following formula:

$$\vec{F_1^h} = \text{Encoder}(\vec{E_1^h});$$

$$\vec{Z_1^{h*}} = \text{Attention}(\vec{F^r}; \vec{F_1^h});$$

where $\vec{E_1^h}$ represents embedding representation of the first utterance, namely, embedding representation 1; and $\vec{F^r}$ represents candidate response encoding representation.

then performing encoding operation on embedding representation of the second utterance in the historical conversation by using the encoder, to obtain encoding representation 2, recorded as $\vec{F_2^h}$; then completing the information fusion process for the encoding alignment representation 1 and the encoding representation 2 by using addition operation, to obtain encoding fusion representation 2, recorded as $\vec{T_2^h}$; finally, completing the information screening process of the candidate response encoding representation to the encoding fusion representation 2 by using the attention mechanism, to obtain encoding alignment representation 2, recorded as $\vec{Z_2^h}$; and for specific implementation, see the following formula:

$$\vec{F_2^h} = \text{Encoder}(\vec{E_2^h});$$

$$\vec{T_2^h} = \vec{Z_1^h} + \vec{F_2^h};$$

$$\vec{Z_2^h} = \text{Attention}(\vec{F^r}; \vec{T_2^h});$$

where $\vec{E_2^h}$ represents embedding representation of the second utterance, namely, embedding representation 2; $\vec{Z_1^h}$ represents encoding alignment representation 1; and $\vec{F^r}$ represents candidate response encoding representation.

then performing encoding operation on embedding representation of the third utterance in the historical conversation by using the encoder with an operation process being the same as the operation process of the encoding operation performed on the embedding representation of the second utterance in the historical conversation by using the encoder, to obtain encoding alignment representation 3, recorded as $\vec{Z_3^h}$, and so on, until the same operation is performed on the $n^{th}$ utterance in the historical conversation, finally, obtaining the encoding alignment representation n, recorded as $\vec{Z_n^h}$; for the $n^{th}$ utterance in the historical conversation, performing encoding operation on an embedding representation of the $n^{th}$ utterance in the historical conversation by using the encoder, to obtain encoding representation n, recorded as $\vec{F_n^h}$; then completing the information fusion process for the encoding alignment representation n-1 and the encoding representation n by using addition operation, to obtain encoding fusion representation n, recorded as $\vec{T_n^h}$; finally, completing the information screening process of the candidate response encoding representation to the encoding fusion representation n by using the attention mechanism, to obtain encoding alignment representation n, recorded as $\vec{Z_n^h}$; and for specific implementation, see the following formula:

$$\vec{F_n^h} = \text{Encoder}(\vec{E_n^h});$$

$$\vec{T_n^h} = \vec{Z_{n-1}^h} + \vec{F_n^h};$$

$$\vec{Z_n^h} = \text{Attention}(\vec{F^r}; \vec{T_n^h});$$

where $\vec{E_n^h}$ represents embedding representation of the $n^{th}$ utterance, namely, embedding representation n; $\vec{Z_{n-1}^h}$ represents encoding alignment representation n-1; and $\vec{F^r}$ represents candidate response encoding representation.

finally, completing the information fusion process for the encoding alignment representation n and the candidate response encoding representation by using addition operation, to obtain semantic feature representation of the conversation, recorded as $\vec{Q}$; and for specific implementation, see the following formula:

$$\vec{Q} = \vec{F_n^h} + \vec{F^r};$$

where $\vec{Z_n^h}$ represents the encoding alignment representation n; and $\vec{F^r}$ represents the candidate response encoding representation.

For example, when the disclosure is implemented on the Ubuntu Dialogue Corpus data set, a Transformer Encoder is selected as the encoding structure Encoder, with the encoding dimension set to 768; the number of layers set to 2; a Dot-Product Attention calculation method is selected as the Attention mechanism, and with calculation of the encoding alignment representation 1 as an example, the calculation process is as follows:

$$F(\vec{F^r}, \vec{F_1^h}) = \vec{F^r} \otimes \vec{F_1^h};$$

the formula represents the interaction calculation between the candidate response encoding representation and the encoding representation 1 through dot product multiplication operation, $\vec{F^r}$ represents the candidate response encoding representation, $F_1^h$ represents the encoding representation 1, and $\otimes$ represents the dot product multiplication operation.

$$\alpha_i = \frac{\exp\left(F\left(\vec{F^r}, \vec{F_1^h}\right)\right)}{\sum_{i'=1}^{l} \exp\left(F\left(\vec{F^r}, \vec{F_{1i}^h}\right)\right)}, i = 1, 2, esen;$$

the formula represents acquiring attention weight α through normalization operation, I and i' represent element subscripts in the corresponding input tensor, l represents the number of elements in the input tensor $F_1^h$, and meanings of other signs are the same as in the above formula;

$$\vec{Z} = \sum_{i=1}^{l} \alpha_i \vec{F_{1i}^h};$$

the formula represents completing feature screening of the encoding representation 1 by using the obtained attention weight, so as to obtain the encoding alignment representation 1; l represents the number of elements in $F_1^h$ and α.

In pytorch, the code described above is implemented as follows:

```
# the calculation process of attention is defined.
def dot_attention(s1, s2):
    s1_s2 dot=tf.expand_dims(s1, axis=1)*tf.expand_dims (s2, axis=2)
    sd1=tf.multiply (tf.tanh (K.dot(s1_s2_dot, self.Wd)), self.vd)
    sd2=tf.squeeze (sd1, axis=-1)
    ad=tf.nn.softmax(sd2)
    qdq=K. batch_dot(ad, s2)
    return qdq
# the encoding structure is defined.
encoder_layer=nn.       TransformerEncoderLayer
    (d_model=512,            nhead=8)         self.
    transformer_encoder=nn. TransformerEncoder (encoder_layer,
layers=2)
# codes
e_r=response_embed
f_r=self. transformer_encoder(e_r)
e_h_list=history_embed_list
```

```
lin=' '
for i in range (n):
    f_h=self. transformer_encoder(e_h_list[i])
    if lin !=' ':
        f_h=f_h+lin
    lin=dot_attention(f_r, f_h)
z_r_final=lin
```
final_I=z_r_final+f_r where history_embed_list represents a list of embedding representations of all utterances in the historical conversation; response_embed represents candidate response embedding representation; z_r_final represents encoding alignment representation n; final_I represents semantic feature representation of conversation; d_model represents the size of the word vector required by the encoder, which is set to 512 here; n head represents the number of heads in a multi-head attention model, which is set to 8 here; layers represents the number of layers of the encoding structure, which is set to 2 here.

Although the embodiments of the disclosure have been shown and described, those of ordinary skill in the art can understand that various changes, modifications, replacements, and variations can be made to these embodiments without departing from the principle and spirit of the disclosure, and the scope of the disclosure is defined by the appended claims and equivalents thereof

What is claimed is:

1. A multi-turn human-machine conversation method based on a time-sequence feature screening encoding module, comprising:
   S1, acquiring a multi-turn human-machine conversation data set;
   S2, constructing a multi-turn human-machine conversation model: constructing a multi-turn human-machine conversation model based on a time-sequence feature screening encoding module;
   S3, training the multi-turn human-machine conversation model: training the multi-turn human-machine conversation model constructed in S2 using the multi-turn human-machine conversation data set obtained in S1;
   the constructing a multi-turn human-machine conversation model in S2 comprises constructing an input module, constructing a pre-training model embedding module, constructing a time-sequence feature screening encoding module, and constructing a label prediction module, wherein the input module constructs input data;
   the input module is configured to, for each piece of data in the data set, record all sentences in a historical conversation as $h_1, h_2, \ldots h_n$ respectively according to a sequence of the conversation; select a response from a plurality of responses as a current response and formalize the response as r; determine a label of the data according to whether the response is a positive response, that is, if the response is a positive response, record the label as 1, otherwise, record the label as 0; and $h_1, h_2, \ldots h_n$, r and the label form a piece of the input data together;
   the pre-training model embedding module is configured to perform embedding processing on the input data by using a pre-training language module BERT, to obtain embedding representation and candidate response embedding representation of each utterance in the historical conversation, recorded as $\vec{E_1^h}, \vec{E_2^h}, \ldots E_n^h$ and $\vec{E^r}$;

$\vec{E_1^h}=\text{BERT}(h_1), \vec{E_2^h}=\text{BERT}(h_2), \ldots, \vec{E_n^h}=\text{BERT}(h_n)$;
$\vec{E^r}=\text{BERT}(r)$ wherein $h_1, h_2, \ldots h_n$ represent a first utterance, a second utterance, a third utterance, . . . , a $n^{th}$ utterance (n is an integer) in the historical conversation, and r represents a candidate response;

the time-sequence feature screening encoding module is configured to receive the embedding representation and candidate response embedding representation of each utterance in the historical conversation; then the time-sequence feature screening encoding module is configured to encode the embedding representation and candidate response embedding representation by using an encoder; the time-sequence feature screening encoding module is further configured to perform semantic information screening and time-sequence feature extraction through an attention mechanism and fusion operation, to obtain semantic feature representation of the conversation;

a process for implementing the time-sequence feature screening encoding module comprises:

firstly, encoding the candidate response embedding representation by using the encoder, to obtain the candidate response encoding representation, recorded as $\vec{F^r}$;

$\vec{F^r}=\text{Encoder}(\vec{E^r})$;

wherein $\vec{E_1^h}$ represents the candidate response embedding representation;

then performing a first encoding process on the embedding representation of the first utterance in the historical conversation by using the encoder to obtain a first encoding representation, recorded as $\vec{F_1^h}$; then performing the semantic information screening of the candidate response encoding representation to the first encoding representation by using the attention mechanism, to obtain a first encoding alignment representation, recorded as $\vec{Z_1^h}$;

$\vec{F_1^h}=\text{Encoder}(\vec{E_1^h})$;

$\vec{Z_1^h}=\text{Attention}(\vec{F^r};\vec{F_1^h})$;

wherein $\vec{E_1^h}$ represents embedding representation of the first utterance, namely, the first embedding representation; $\vec{F^r}$ represents candidate response encoding representation;

then performing a second encoding process on the embedding representation of the second utterance in the historical conversation by using the encoder to obtain a second encoding representation, recorded as $\vec{F_2^h}$; then performing an information fusion process for the first encoding alignment representation and the second encoding representation by using addition operation, to obtain a second encoding fusion representation, recorded as $\vec{T_2^h}$; performing the information screening process of the candidate response encoding representation to the second encoding fusion representation by using the attention mechanism, to obtain a second encoding alignment representation, recorded as $\vec{Z_2^h}$;

$\vec{F_2^h}=\text{Encoder}(\vec{E_2^h})$;

$$\vec{T_2^h} = \vec{Z_1^h} + \vec{F_2^h}$$

$$\vec{Z_2^h} = \text{Attention}(\vec{F^r}; \vec{T_2^h});$$

wherein $\vec{E_2^h}$ represents embedding representation of the second utterance, namely, the second embedding representation; $\vec{Z_1^h}$ represents the first encoding alignment representation; and $\vec{F^r}$ represents candidate response encoding representation;

then performing the second encoding process on the embedding representation of the third utterance in the historical conversation to obtain a third encoding alignment representation, recorded as $\vec{Z_3^h}$; continuing to perform the second encoding process on the embedding representation of the $(n-1)^{th}$ utterance in the historical conversation to obtain a $(n-1)^{th}$ encoding alignment representation, recorded as $\vec{Z_{n-1}^h}$; for the $n^{th}$ utterance in the historical conversation, encoding the embedding representation of the $n^{th}$ utterance in the historical conversation by using the encoder, to obtain a $n^{th}$ encoding representation, recorded as $\vec{F_n^h}$; then performing the information fusion process for the $(n-1)^{th}$ encoding alignment representation and the $n^{th}$ encoding representation by using addition operation, to obtain a $n^{th}$ encoding fusion representation, recorded as $\vec{T_n^h}$; performing the information screening process of the candidate response encoding representation to a $n^{th}$ encoding fusion representation by using the attention mechanism, to obtain a $n^{th}$ encoding alignment representation, recorded as $\vec{Z_n^h}$;

$$\vec{F_n^h} = \text{Encoder}(\vec{E_n^h});$$

$$\vec{T_n^h} = \vec{Z_{n-1}^h} + \vec{F_n^h};$$

$$\vec{Z_n^h} = \text{Attention}(\vec{F^r}; \vec{T_n^h});$$

wherein $\vec{E_n^h}$ represents embedding representation of the $n^{th}$ utterance, namely, the $n^{th}$ embedding representation; $\vec{Z_{n-1}^h}$ represents $(n-1)^{th}$ encoding alignment representation; and $\vec{F^r}$ represents candidate response encoding representation;

performing the information fusion process for the $n^{th}$ encoding alignment representation and the candidate response encoding representation by using the addition operation, to obtain semantic feature representation of the conversation, recorded as $\vec{Q}$;

$$\vec{Q} = \vec{Z_n^h} + \vec{F^r};$$

wherein $\vec{Z_n^h}$ represents $n^{th}$ encoding alignment representation; and $\vec{F^r}$ represents candidate response encoding representation; and completing prediction of a candidate response.

2. The multi-turn human-machine conversation method based on a time-sequence feature screening encoding module according to claim 1, comprising a multi-turn human-machine conversation apparatus applied in the method, the apparatus comprising:

a multi-turn human-machine conversation data set acquisition unit, configured to download a disclosed multi-turn human-machine conversation data set from a network or automatically construct a multi-turn human-machine conversation data set;

a multi-turn human-machine conversation model construction unit, configured to construct a pre-training model embedding module, construct a time-sequence feature screening encoding module, and construct a label prediction module, so as to construct a multi-turn human-machine conversation model; and a multi-turn human-machine conversation model training unit, configured to construct a loss function and an optimization function, thus completing prediction of a candidate response.

* * * * *